Patented May 13, 1952

2,596,920

UNITED STATES PATENT OFFICE 2,596,920

SYNTHESIS OF OXYGENATED ORGANIC COMPOUNDS

Warren M. Smith and William D. Luening, Baton Rouge, La., and Stanley C. Lane, Roselle, N. J., assignors to Standard Oil Development Company, a corporation of Delaware Application July 30, 1948, Serial No. 41,668

20 Claims. (Cl. 260—604)

The present invention relates to an improved synthesis process for the production of oxygenated organic compounds by reacting organic compounds having an olefinic double bond with gas mixtures containing carbon monoxide and hydrogen at high pressures and elevated temperatures in the presence of suitable catalysts. More particularly, the invention is concerned with an improved method for removing dissolved metal carbonyl and carbon monoxide from the oxygenated synthesis product prior to storage or further treatment such as catalytic hydrogenation.

The synthesis of oxygenated organic compounds from olefinic compounds and mixtures of CO and $H_2$ is well known in the art. The olefinic starting material is reacted in the liquid state with CO and $H_2$ in the presence of a metal catalyst, usually an iron group metal catalyst such as a suitable cobalt compound. The reaction product consists essentially of organic carbonyl compounds, mainly aldehydes, and alcohols having one carbon atom more per molecule than the olefinic feed material. The oxygenated product may be hydrogenated in a second catalytic stage to convert the aldehydes to the corresponding alcohols.

Practically all types of organic compounds having an olefinic double bond may be used as the starting material, including aliphatic olefins and diolefins, cyclo-olefins, aromatics with olefinic sidechains, oxygenated compounds having olefinic double bonds, etc. The metal catalyst may be present as a solid or in the form of an organic salt soluble in the olefinic feedstock. Suitable reaction conditions include temperatures of about 150–450° F., pressures of 100–300 atmospheres, hydrogen to carbon monoxide ratios of about 0.5–4.0:1, liquid feed rates of about 0.1–5.0 v./v./hr. and gas feed rates of about 1000–45,000 standard cu. ft. of gas mixture per barrel of liquid olefinic feed.

Similar temperatures and pressures and conventional hydrogenation catalysts such as nickel, copper, tungsten, oxides or sulfides of group VI and group VIII metals, etc., may be employed in the second stage for the hydrogenation of the carbonyl compounds.

The iron group metals used as catalysts in the first stage of the process react with CO to form metal carbonyls. This is particularly true for cobalt, the preferred and most active oxygenation catalyst. This cobalt carbonyl which dissolves in the liquid oxygenated product tends to decompose under low CO partial pressures even at relatively low temperatures and very rapidly at elevated temperatures, to form free CO and insoluble metallic cobalt. Metallic cobalt so separated seriously interferes with the further processing of the oxygenated reaction product because it may cause excessive pressure drop in the equipment due to deposition of cobalt in lines and vessels or it may deactivate the hydrogenation catalyst of the second stage by surface deposition of cobalt. Since cobalt carbonyl slowly decomposes under low CO partial pressures even on standing at atmospheric pressure it should be removed as soon upon the formation of the oxygenated product as possible.

Prior to the present invention it has been suggested to remove cobalt carbonyl from the oxygenated product by treating with hydrogen at relatively high pressures and elevated temperatures in vessels packed with an inert solid on which the separated cobalt is deposited and from which a substantially carbonyl-free liquid product may be withdrawn, the liberated CO being removed with the hydrogen used for treating. These procedures, while effective, require relatively long residence times usually in excess of one hour in the decobalting vessel at high temperatures, conditions which are conducive to aldehyde loss by formation of higher molecular weight derivatives. In addition, difficulties due to plugging of the decobalting vessel have been encountered. When shorter residence times are employed the cobalt removal may be incomplete.

The present invention overcomes these difficulties and affords various additional advantages. These advantages, the nature of the invention, and the manner in which it is carried out, will be fully understood from the following description thereof read with reference to the accompanying drawing which shows semi-diagrammatic views of apparatus adapted to carry out the invention.

In accordance with the present invention the total liquid effluent from the oxygenation stage is subjected to a thermal treatment at temperatures high enough to maintain a satisfactorily rapid rate of metal carbonyl decomposition, i. e., a rate substantially higher than the rate of aldehyde condensation or polymerization in the liquid, and at relatively low pressures which are not higher than required just to prevent substantial vaporization of said liquid effluent at the temperatures employed. The previously dissolved gases are separated from the liquid prior to or during the thermal treatment and their removal from the liquid may, if desired, be aided by the use of a stripping gas substantially inert to the liquid product at the conditions applied. By operating under these conditions the residence time required for complete metal carbonyl decomposition and metal separation may be so considerably shortened that aldehyde loss is avoided and the equipment may be substantially simplified to avoid plugging difficulties.

In accordance with more specific embodiments of the invention, plugging of the decobalting system may be substantially minimized or completely eliminated by suitable methods of supplying the heat required for cobalt carbonyl decomposition. For example, one embodiment of the invention involves the supply of heat through surfaces immersed in the liquid to be decobalted. Another embodiment provides for heat supply by direct contact of the cobalt carbonyl-containing product with a preheated cobalt carbonyl-free fluid. Other methods of heat supply will appear hereinafter.

The specific conditions of temperature and pressure used in the carbonyl removal process of the invention depend to a certain extent on the boiling range of the liquid oxygenation product treated. For example it may be stated that temperatures within the approximate range of 200–400° F., preferably 250–350° F., and total pressures within the approximate range of 50–150 lbs. per sq. in. gage are generally suitable for a conventional synthetic oxygenated, cobalt carbonyl-containing product having an average of 6 or more carbon atoms per molecule. A cobalt carbonyl-containing product having an average of 9 or more carbon atoms per molecule may be treated with good results, in which case pressures as low as 0–100 lbs. per sq. in. gage may be used.

Having set forth its general nature, the invention will be best understood from the following more detailed description in which reference will be made to the accompanying drawing wherein.

Figure 1:
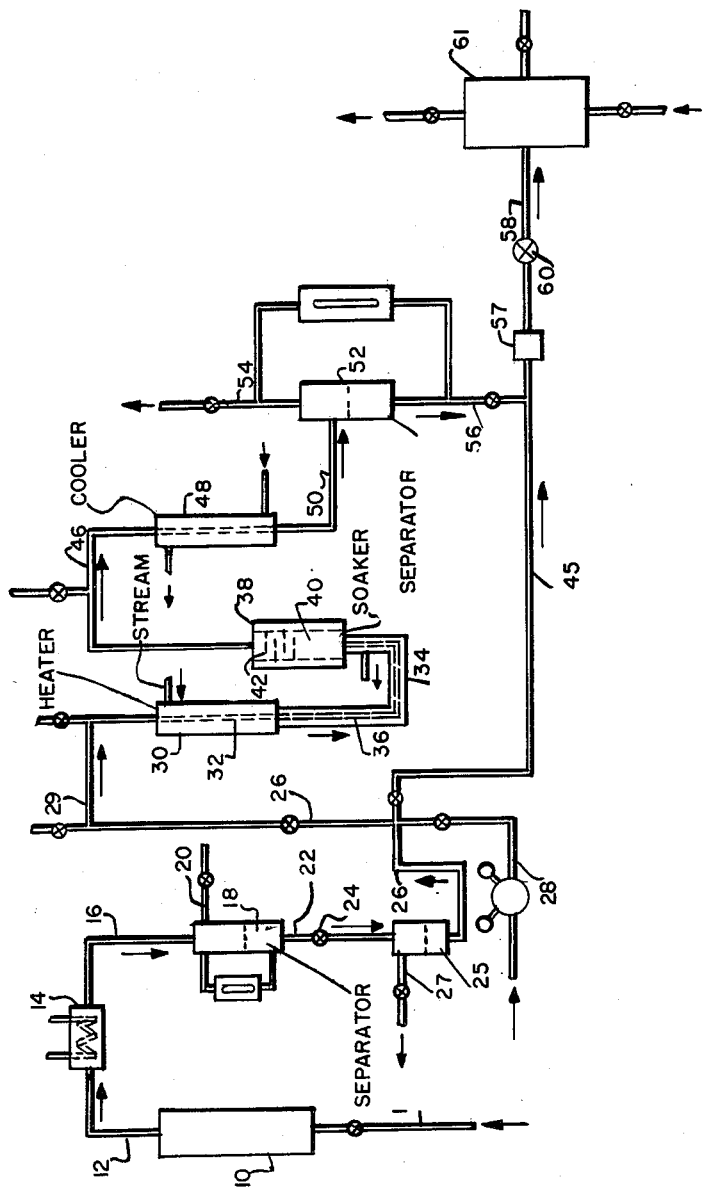
Figure 1 illustrates a system wherein the heat required for carbonyl removal is applied externally to a tube carrying the oxygenated product to be treated.

Referring now in detail to Figure 1, the system illustrated therein essentially comprises an oxygenation reactor 10, a separator 18, a heater 30 and a soaking vessel 40 whose functions and cooperation will be forthwith explained using the removal of cobalt carbonyl from an oxygenated reaction product having an average of 7–9 carbon atoms per molecule as an example. It should be understood however that the system may be applied to the treatment of heavier or lighter oxygenated products containing the same or a different metal carbonyl.

In operation, the liquid olefinic feed stock having an average of about 6–8 carbon atoms per molecule and a gas mixture containing CO and $H_2$ in the approximate ratio of 1:1 are introduced through line 1 into the bottom of reactor 10. The catalyst, preferably in the form of a cobalt salt soluble in the feed, such as cobalt naphthenate, stearate, oleate, etc. may be added to the liquid feed in concentrations of about 0.1–3% by weight. If desired, reactor 10 may be provided with a bed of cobalt catalyst supported on an inert carrier such as silica gel, pumice or the like.

Reactor 10 is operated at conventional oxygenation conditions including temperatures of about 300–400° F., pressures of about 2500–3500 lbs. per sq. in., a gas feed rate of about 3000–40,000 standard cu. ft. per barrel of liquid feed and a liquid feed throughout of about 0.2 to 2 volumes per volume of reactor space per hour. The reaction products consisting of liquid oxygenated products containing about 0.05 to 0.3% by weight of dissolved cobalt mainly as cobalt carbonyl are removed, together with unreacted gas, through line 12, cooled to about 80–120° F. in cooler 14 and passed through line 16 to a liquid-gas separator 18. Gas separated in separator 18 is withdrawn through line 20 and may be recycled to line 1 for reuse in reactor 10.

The liquid separated in separator 18, still at the pressure of reactor 10, is withdrawn downwardly through line 22 provided with pressure release valve 24. The liquid product is now under a low pressure of about 50–150 lbs. per sq. in. at which the major portion of the previously dissolved gas is released. This liquid-gas mixture is separated in low-pressure separator 25, from which the gas is withdrawn through line 27. The liquid withdrawn through line 26 is mixed, if desired, with CO-free hydrogen or inert gas supplied from line 28 in amounts of about 50 to 500 standard cu. ft. per barrel of liquid. The mixture of oxygenated liquid product and hydrogen enters heater 30 through line 29.

Heater 30 may consist of one or more pipes 32 provided with a steam jacket as indicated in the drawing. The temperature of heater 30 is so controlled that the mixture flowing through pipe 32 is heated to a temperature of about 300–400° F. by the time it leaves heater 30. The heated mixture is now under conditions of temperature, total pressure and CO partial pressure adequate to provide for the rapid decomposition of cobalt carbonyl, while appreciable boiling of the liquid product is prevented.

Cobalt carbonyl decomposition starts in heater 30. The mixture of gas and liquid product now containing in addition to dissolved cobalt carbonyl some suspended metallic cobalt, flows through line 34 to soaking vessel 40. Both line 34 and vessel 40 may be provided with suitable insulating means or steam jackets 36 and 38, respectively, to prevent heat losses. Soaking vessel 40 is so dimensioned that sufficient residence time for the liquid product is provided at the temperature and pressure conditions specified, to permit substantially complete decomposition of the cobalt carbonyl. Residence times substantially below one hour are generally sufficient for this purpose. If desired, vessel 40 may be provided with baffles 42, preferably removable, to extend the path of the liquid. If required, any cobalt metal deposited on baffles 42 may be periodically removed to prevent plugging of the system. A by-pass line 45 is provided to permit by-passing of the decobalting system during cleaning periods or for other purposes.

The gas-liquid mixture now substantially free of cobalt carbonyl and, as a result of the low CO partial pressure, likewise substantially free of dissolved CO is passed through line 46 to a cooler 48 wherein it is cooled to about 80–120° F. The cooled mixture flows through line 50 to a gas-liquid separator 52. A gas consisting of hydrogen or inert gas and small amounts of CO is withdrawn overhead from separator 52 through line 54 to be vented or used for any suitable purpose.

The liquid product now containing less than about 0.005% by weight of cobalt carbonyl is withdrawn downwardly from separator 52 through line 56 and filter 57 which removes suspended metallic cobalt after which the liquid product is passed through line 58 provided with a pressure release valve 60 to a product accumulator (not shown) and to further conventional processing by hydrogenation, in a conventional catalytic hydrogenator 61.

Systems of the type illustrated in Figure 1, when operated at the conditions specified, permit decobalting of oxygenated product within decobalting times substantially below one hour, i. e. short enough effectively to prevent aldehyde condensation. It has been observed however that cobalt may deposit on the highly heated metal surfaces of pipe 32, which may cause plugging of pipe 32 after runs of say about 1 or 2 days' duration. This difficulty may be eliminated by employing the embodiment of the invention illustrated in Figure 2 wherein like reference numerals are used to identify elements similar to those of Figure 1.

Figure 2:
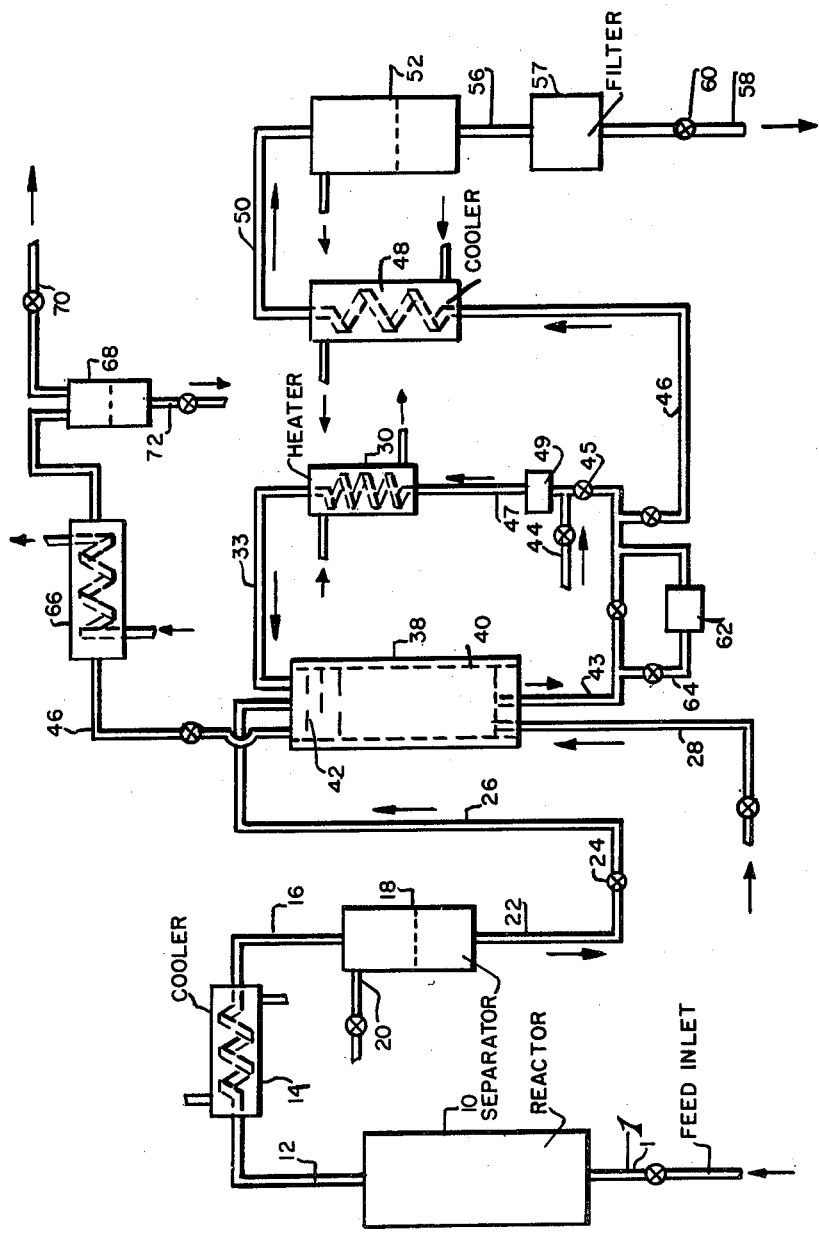
Figure 2 shows an arrangement in which the cobalt carbonyl-containing liquid is heated by direct contact with a preheated fluid substantially free of cobalt carbonyl and carbon monoxide.

Referring now specifically to Figure 2, the operation of the system up to the passage of the liquid product through pressure release valve 24 is identical with that described in connection with Figure 1. The depressurized cobalt carbonyl-containing liquid now passes at the temperature of separator 18 through line 26 to the top of soaking vessel 40 where it is mixed with liquid oxygenated product heated in heater 30 to a temperature of about 300–400° F. and supplied through line 33, as will appear more clearly hereinafter. The amount of heated liquid supplied through line 33 is such that the mixture in vessel 40 attains a temperature of about 250–350° F.

The thus heated liquid mixture flows down through vessel 40. By holding a liquid level in vessel 40, and allowing gas to separate from the liquid therein, it is possible to eliminate the separator 25, in which case, however, it may be advantageous to feed an inert stripping gas such as nitrogen, methane or CO-free hydrogen through line 28 in the amounts specified before. However, decomposition of cobalt carbonyl takes place so rapidly in vessel 40 at the favorable conditions specified, that the inert gas supply through line 28 may be substantially reduced and even completely eliminated, particularly at relatively low cobalt carbonyl concentrations of the liquid of say not substantially above 0.2%.

A liquid product substantially free of cobalt carbonyl is withdrawn downwardly from vessel 40 through line 43. One portion of the withdrawn substantially carbonyl-free liquid, corresponding to the amount of liquid supplied through line 26 is passed on through line 46 to cooler 48 and separator 52, as described in connection with Figure 1. Suspended cobalt metal may be removed from the liquid leaving separator 52 by filtering means 57.

The remainder of the carbonyl-free liquid in line 42 is passed through line 47 provided with pump 49 to heater 30 and from there through line 33 to vessel 40 as described before. Because no dissolved cobalt carbonyl is present in heater 30 the latter may be operated at any suitable temperature which may be as high as 300–400° F., without any danger of cobalt deposition on hot heater surfaces. The actual decomposition of dissolved cobalt carbonyl takes place exclusively in vessel 40 in the absence of hot heat-supplying surfaces. In this manner, cobalt deposition on any hot heat-supplying surfaces is avoided throughout the system. Residence times in heater 30 and vessel 40 may be about 5–60 minutes, and may advantageously be maintained between about 15 and 30 minutes. If desired, separated cobalt metal may be removed from the liquid flowing through line 43 by a filter 62 arranged on branch line 64, to avoid plugging of subsequent system elements.

The gases liberated in or introduced into vessel 40, containing traces of vaporized liquid, are removed overhead through line 46 and passed through cooler 66 to a gas-liquid separator 68 from which gas may be vented or recovered overhead through line 70. Any separated liquid, such as that carried by entrainment in the gas leaving vessel 40 or resulting from condensation of the minor amounts of liquid vaporized in vessel 40, is withdrawn downwardly through line 72 to be recovered or recycled to reactor 10.

As a modification of the embodiment of Figure 2, the hot liquid supplied through line 33 may be an extraneous liquid, substantially inert to the aldehyde product, for example, a hydrocarbon liquid boiling higher than the liquid product. This liquid may be introduced through line 44, in which case valve 45 is closed and no product is pumped to heater 30. The extraneous liquid may be separated from the product by distillation, extraction, or other means, and recycled to line 44 if desired.

In some instances an alternate embodiment of the invention may be used, in which the cool liquid entering vessel 40 is heated by admixture with heated gas. In this case, referring again to Figure 2, a relatively large volume of heated gas, substantially CO-free, is introduced through line 28 thus eliminating a part or all of the liquid heating otherwise accomplished in heater 30. The gas may be an inert gas such as nitrogen or methane, or it may be one of the hydrogen streams used elsewhere in the process.

A further embodiment of the invention, designed to avoid plugging difficulties is illustrated in a simplified manner by Figure 3 which shows merely the decobalting means proper, all other system elements which may be substantially the same as those described in connection with Figure 1 and/or 2 having been omitted.

Figure 3:
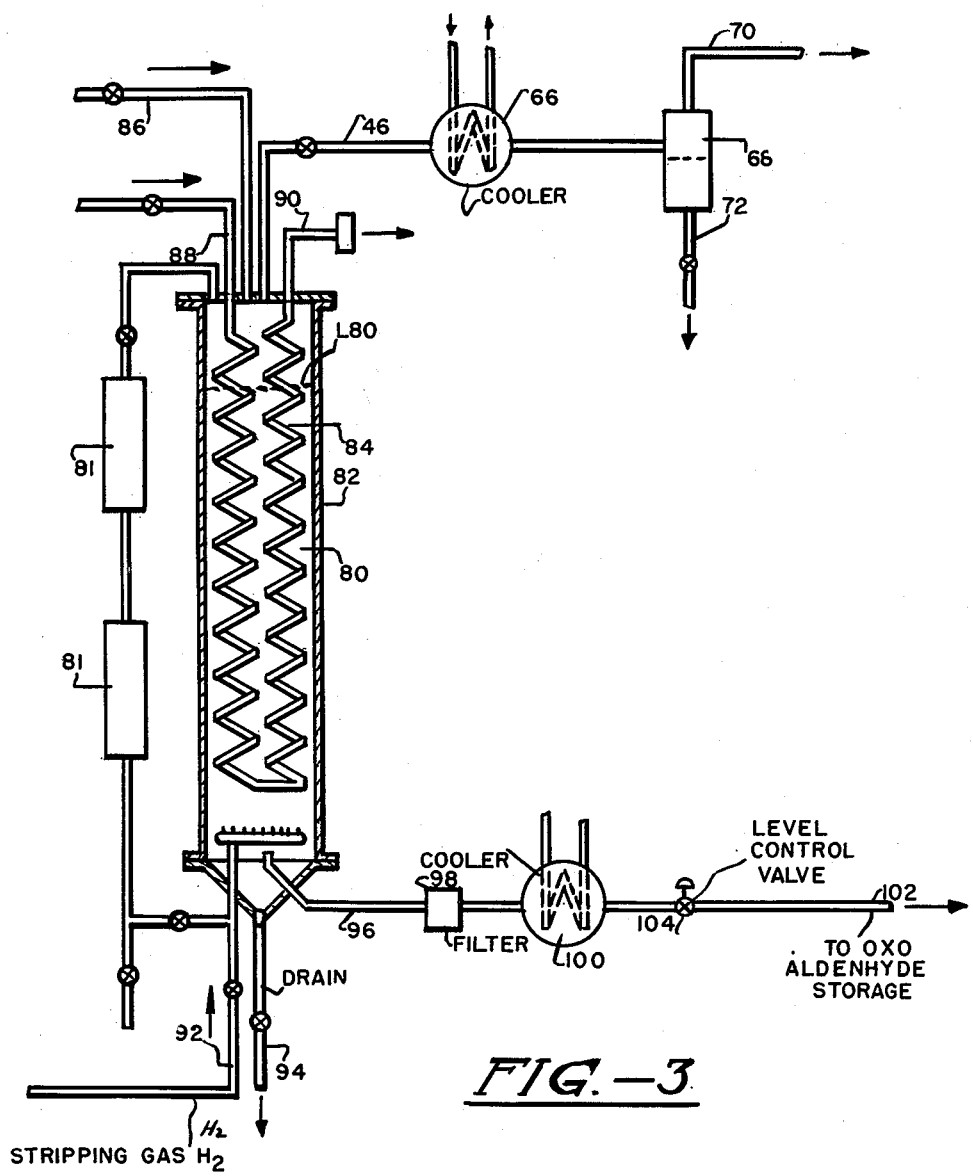
Figure 3 is an illustration of internal heat supply through immersed heat transfer surfaces.

The decobalting means of Figure 3 consists essentially of a single vessel 80 which takes the place of heater 30 and vessel 40 of Figures 1 and 2. Vessel 80 comprises an elongated relatively wide tube 82 which may have a diameter of say about 16″ and which may be provided with a level indicator 81. Arranged within tube 82, essentially over its entire length, is a steam coil 84 which may be made of pipe having a diameter of say about ¼–¾″.

In operation, liquid oxygenated product containing dissolved cobalt carbonyl is supplied to the top of vessel 80 through line 86 at a temperature of about 80–120° F. and a pressure of about 80–120 lbs. per sq. in. to substantially completely fill vessel 80 as indicated by level $L_{80}$. Heating steam is supplied through line 88 and withdrawn through line 90, in a manner adequate to heat the liquid within vessel 80 to about 300–400° F. If desired, CO-free hydrogen or inert gas may be supplied to the bottom of vessel 80 through line 92 in the proportions specified in connection with line 28 of Figures 1 and 2.

Carbonyl decomposition proceeds rapidly within residence times of about 5 to 60 minutes, preferably 15–30 minutes, which are not conducive to aldehyde condensation or polymerization. Any separated cobalt metal which collects in the bottom of vessel 80 may be withdrawn through drain 94. While some cobalt metal may be deposited on heating coil 84 the free cross-sectional area of vessel 80 is so much larger than that of the pipe in heater 30 of Figure 1 that no plugging trouble will arise for an extended period of time. In addition any cobalt deposited on the outer surface of the heating coils 84 may be more readily removed than from the inside surface of the heating tube of heater 30 of Figure 1.

Liquid oxygenated product substantially free of dissolved cobalt carbonyl and CO is withdrawn through line 96 from the bottom of vessel 80 at a point above drain 94. The withdrawn liquid may be freed of any residual cobalt metal in filter 98, cooled in cooler 100 and passed to storage through line 102 provided with a level control valve 104. Separated gas containing only small amounts of vaporized liquid is withdrawn overhead from vessel 80 through line 46 to be further treated in elements 66 and 68 as outlined in connection with Figure 2.

While hydrogen is preferable whenever a gas is to be used for stripping and reduction of the CO partial pressure in all decobalting elements of the invention described above, other gases inert to the oxygenated liquid product may be employed, for example, methane, nitrogen, etc. Other modifications of the system illustrated in the drawing may appear to those skilled in the art without departing from the spirit and scope of the invention.

The invention will be further illustrated by the following specific example summarizing the results obtainable at different operating conditions for an oxygenated product containing an average of about 8 carbon atoms per molecule when using different embodiments of the invention.

*Example*

| Operation in accordance with— | Figure 2 | | Figure 3 | |
|---|---|---|---|---|
| Decobalting Vessel Conditions: | | | | |
| Pressure, p. s. i. g. | 100 | 100 | 100 | 100 |
| Temperature, °F | 325 | 305 | 310 | 310 |
| Inlet Gas | None | Hydrogen | None | Hydrogen |
| Inlet Gas Rate, CF/Bbl | 0 | 300 | 0 | 300 |
| Oxo Aldehyde Product—Weight Percent Soluble Cobalt: | | | | |
| Before Decobalting Vessel | 0.18 | 0.085 | 0.033 | 0.107 |
| After Decobalting Vessel | 0.001 | 0.001 | 0.005 | 0.005 |

While the foregoing description and exemplary operations have served to illustrate specific applications and results, the invention is not limited thereto. Only such limitations should be imposed on the invention as are indicated in the appended claims.

What is claimed is:

1. In a continuous carbonylation process wherein carbon compounds containing olefinic double bonds are contacted in an initial reaction zone with carbon monoxide and hydrogen in the presence of cobalt catalyst under conditions to produce reaction products comprising oxygenated organic compounds containing one more carbon atom than said carbon compounds, which reaction conditions comprise pressures of about 100 to 300 atmospheres, and wherein cobalt compounds including cobalt carbonyls are dissolved in said reaction products, the improvement which comprises passing said reaction products and the therein dissolved cobalt compounds to a catalyst decomposition zone, maintaining catalyst decomposition conditions comprising pressures substantially lower than in said initial reaction zone and just sufficient to prevent substantial vaporization of liquid reaction products at decomposition temperatures and temperatures in the range of from about 200° to about 400° F. whereby a high cobalt carbonyl decomposition rate is maintained and substantial vaporization of liquid prevented, and removing a liquid product comprising aldehydes substantially free of dissolved catalyst from said catalyst decomposition zone.

2. The process of claim 1 in which said decomposition rate is substantially higher than the rate of condensation and polymerization of aldehyde components of said liquid product at the treating conditions.

3. The process of claim 1 in which said oxygenated product has an average of at least six carbon atoms per molecule, said temperature is about 200–400° F., and said pressure is about 50 to 150 lbs. per sq. in.

4. The process of claim 1 in which said oxygenated product has an average of at least nine carbon atoms per molecule, said temperature is about 200–400° F. and said pressure is about 0 to 100 lbs. per sq. in.

5. The process of claim 1 in which an extraneous gas is supplied to said treating zone.

6. The process of claim 5 in which said gas is hydrogen.

7. The process of claim 1 in which said temperature is maintained by passing said liquid oxygenated product containing said cobalt carbonyl through an externally heated narrow path.

8. The process of claim 1 in which said temperature is mantaned by mixing a fluid, highly heated in the absence of dissolved cobalt carbonyl, with said cobalt carbonyl containing liquid product.

9. The process of claim 8 in which said fluid is a liquid.

10. The process of claim 9 in which said liquid is liquid oxygenated product previously freed of dissolved cobalt carbonyl.

11. The process of claim 9 in which said liquid is an extraneous liquid.

12. The process of claim 8 in which said fluid is a gas substantially inert to said product.

13. The process of claim 1 in which said temperature is maintained by supplying heat indirectly by a confined flowing stream of hot fluid immersed in said cobalt carbonyl-containing liquid product in said treating zone.

14. The process of claim 13 in which said confined flowing stream is of relatively small diameter contrasted with said treating zone diameter.

15. The process of claim 1 in which at least a portion of said removed cobalt carbonyl-free liquid is subjected to catalytic hydrogenation to convert carbonyl compounds into alcohols.

16. In the process of removing dissolved cobalt carbonyl from the liquid oxygenated product of the conversion of organic compounds having an olefinic double bond with CO and $H_2$ in the presence of carbonyl-forming cobalt catalysts, said liquid oxygenated product comprising substantial amounts of aldehydes, by heating said liquid product in a catalyst decomposition zone under catalyst decomposition conditions including elevated temperatures, the improvement which comprises maintaining decomposition temperature by mixing said product in said catalyst decomposition zone with a fluid sufficient in amount and preheated in the absence of dissolved cobalt carbonyl to a temperature sufficient to keep the mixture formed at said decomposition temperature.

17. The process of claim 16 in which said fluid is a liquid.

18. The process of claim 17 in which said liquid is an extraneous liquid.

19. The process of claim 16 in which said fluid is a gas.

20. In the process of removing dissolved cobalt carbonyl from the liquid oxygenated product of the conversion of organic compounds having an olefinic double bond with CO and $H_2$ in the presence of carbonyl-forming cobalt catalysts by heating said liquid product in a catalyst decomposition zone at elevated temperatures, the improvement which comprises maintaining decomposition temperature by supplying heat to said decomposition zone through heat transfer surfaces immersed in said cobalt carbonyl-containing liquid product.

WARREN M. SMITH.
WILLIAM D. LUENING.
STANLEY C. LANE.

REFERENCES CITED

The following references are of record in the file of this patent:

U. S. Naval Technical Mission in Europe, "The Synthesis of Hydrocarbons and Chemicals from CO and $H_2$," page 122, August 2, 1946.

Fiat Final Report No. 1000, December 26, 1947, pages 8–10.

Bureau of Mines Report of Investigations 4270, page 6, June 1948.